Feb. 11, 1969 J. J. KUBINEC 3,427,598

EMITTER GATED MEMORY CELL

Filed Dec. 9, 1965

Sheet 1 of 2

INVENTOR.
JAMES J. KUBINEC

BY [signature]

ATTORNEY

INVENTOR.
JAMES J. KUBINEC
BY
ATTORNEY

United States Patent Office 3,427,598

Patented Feb. 11, 1969

3,427,598

EMITTER GATED MEMORY CELL

James J. Kubinec, San Jose, Calif., assignor to Fairchild Camera and Instrument Corporation, Syosset, N.Y., a corporation of Delaware Filed Dec. 9, 1965, Ser. No. 512,628

U.S. Cl. 340—173 5 Claims

Int. Cl. G11b *9/00*

This invention relates to a novel signal storage and processing apparatus, and in particular to a solid state bistable memory device.

Presently known data handlers, such as computers, commonly utilize magnetic cores as memory elements, or bits. Also, thin films, electroluminescent-photoconductive assemblies, transfluxors, and other ferroelectric and ferromagnetic structures have been proposed for use as memory devices in signal storage and processing systems. Generally, each type of memory device is characterized by inherent limitations which tend to restrict the versatility and operation of the systems. For example, in computer systems employing magnetic cores, associated circuitry including buffer stages are needed. Also, core assemblies require a multiplicity of interconnecting electrical windings, adding to space requirements, as well as to the expense of manufacture and maintenance. Thus, new approaches and techniques of signal storage and processing are constantly being sought.

Present day technology affords various solid state devices that are useful for different types of circuits. The trend towards miniaturization has led to the development of integrated circuitry and micromodules. One new device that has been developed is the multiple emitter transistor (MET). The MET is described in detail in U.S. patent application Ser. No. 263,049, filed Mar. 5, 1963, and assigned to the same assignee as this invention. MET devices are now commercially available, such as the Fairchild Semiconductor device No. $\mu$C1134 and $\mu$C9996. It is understood, however that an MET can be made by connecting the bases and collectors of discrete transistors in parallel. Such a device is considered an MET for the purposes of this specification and claims. It would be highly desirable to utilized such a solid state transistor device as a signal storage device for logic circuits and data processing systems.

An object of this invention is to provide a novel and improved means for the storage and processing of signal information.

Another object of this invention is to provide a novel solid state memory device utilizing multi-emitter transistors.

Briefly, the signal storage and processing apparatus of the invention comprises first and second MET each having at least a first, a second and a third emitter, and a base and a collector electrode; a first source of matrix drive signal having two stable states, one active and one inactive state, coupled to the first emitters of both the MET's; a second source of matrix drive signal having two stable states, one active and one inactive state coupled to the second emitters of both the MET's; a pair of data input signal sources coupled respectively to each of the third emitters of both said MET's; a means coupling the base of each MET to the collector of the other MET; and a sense output circuit whose inputs are coupled to both the first and second matrix drive signals and to the collector of one of the MET's whereby the sense output circuit is enabled to receive data from one of the first and second MET's when both the first and second matrix drive signals are in the active state.

The invention will be described in greater detail with reference to the drawing in which.

Similar numerals refer to similar elements throughout the drawing.

Figure 1:
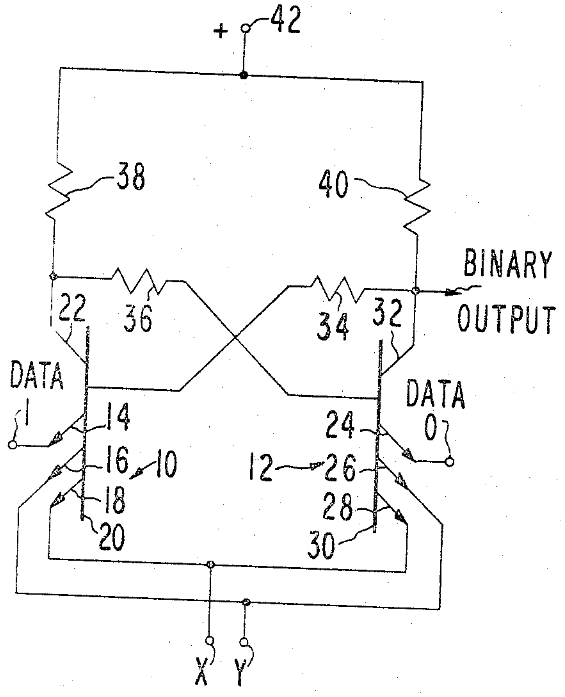
FIGURE 1 is a schematic circuit diagram of the storage device, according to this invention.

With reference to FIG. 1, the solid state memory element or bistable storage device of this invention comprises a pair of cross-coupled multi-emitter transistors 10 and 12. The transistor pair may be formed by planar epitaxial processes and may constitute an integrated unit. Any number of such units may be joined by the technique of diffusion into a wafer.

The MET 10 has three distinct emitter or common electrodes 14, 16, and 18, a base output electrode 20, and a collector or output electrode 22, the electrodes being arranged in NPN fashion. Similarly, the MET 12 has three emitter electrodes 24, 26, and 28, a base 30 and a collector electrode 32, also in an NPN arrangement. The base of the MET 10 is coupled through a resistance 34 to the output electrode or collector 32 of the MET 12; and the base of the MET 12 is coupled through a resistance 36 to the collector 22 of the MET 10. The collectors 22 and 32 are also connected through load resistors 38 and 40 respectively to a source of positive potential 42, which provides collector voltage to the NPN transistors.

Matrix drive signal sources X and Y are coupled respectively to like emitters 18 and 28, and corresponding emitters 16 and 26. The matrix drive signal sources X and Y must be simultaneously in the active state in order for any incoming data signal to be registered in the memory device. If MET's 10 and 12 are fabricated, as illustrated, as NPN transistors, these devices will be in their active state upon application to the base of a positive voltage; if the devices, on the other hand, are PNP polarity, they will be in their active state upon application of a negative voltage. Throughout this specification, it must be understood that the active states will be reversed from that described if opposite polarity type transistors are employed.

For the purpose of explanation, the circuit of MET 10 is designated as storing binary number "1," whereas the circuit of MET 12 is assigned the storage of binary "0." Thus when the Data 1 signal to the emitter 14 is turned off, so that the emitter 14 is nonconducting, and the Data 0 signal is turned on so that emitter 24 conducts a binary 1 is stored in the memory device. Conversely, if the Data 0 portion of the device is inactive and the Data 1 portion is energized, a binary 0 is registered.

In operation, the memory cell is accessed for write (or read) by coincident trigger voltages applied to signal sources X and Y. When the trigger voltages place X and Y drive lines in the active state, i.e., $XY$=logic 1, then a binary input will be registered or stored, provided that a data input $D_0$ or $D_1$ is also applied in the active state. If both data inputs sensed at emitters 14 and 24 are in the inactive state, then there is no change in the stored signal, in accordance with conventional operation of known binary logic circuits. This is the nondestructive readout feature.

Figures 2A, 2B:
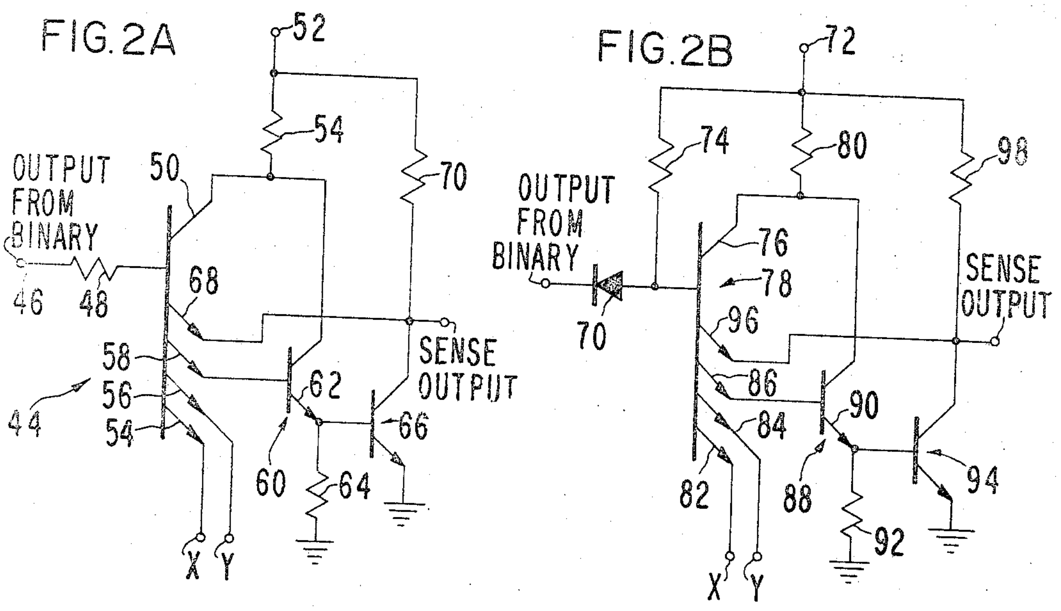
FIGURES 2A and 2B are schematic circuits of the readout or sensing circuits utilized with the present invention.

FIG. 2A illustrates a representative sense output circuit that may be utilized in conjunction with the binary storage device of FIG. 1. To achieve readout, the stored signal is applied to the base of the MET 44 through an input terminal 46 and resistor 48. Input terminal 46 of MET 44 is coupled to the collector of MET 12 in FIG. 1. Positive potential is applied to the circuit of the collector 50 from a source 52 through a resistor 54. The input terminals marked X and Y are coupled to both the first and second matrix drive signal sources X and Y. When the X and Y drive signals are coincidentally in their active state as applied to the emitters 54 and 56, then the transistor 44 is properly biased and thus enabled to receive data from one of MET's 10 and 12 in FIG. 1. The signal is fed from the emitter 58 to the base of the transistor 60, which has its emitter 62 coupled to ground through a bias resistor 64. The readout signal is amplified by a transistor 66 having its base connected to the emitter 62. The signal is channeled from the collector of transistor 66 simultaneously with the data signal that is passed through an emitter 68 of the transistor 44, to a sense output circuit for further processing or display. The circuit including emitter 68 acts as a clamp, and prevents the transistor 66 from saturating. In the network wherein the three transistors 44, 60 and 66 are arranged essentially in a Darlington type circuit, the drive current requirement from the binary storage device is extremely low, such that the sense output circuit functions very well with very low beta transistors. Furthermore, with the inventive circuit, a substantial improvement in noise immunity is realized.

FIG. 2B depicts an alternative embodiment of a readout circuit, which is advantageous in that the circuit presents a load to the binary storage device only when the binary is in the low state; i.e., the low output resistance state of the binary. The circuit of FIG. 2B includes a unidirectional conducting device or diode 70, coupled to a source of potential 72 through a resistor 74. The collector 76 of transistor 78 is also coupled to the source 72 through a resistor 80. A pair of emitters 82 and 84 are tied respectively to the sources of matrix drive signals X and Y for receiving concurrent active signals so that data from the binary storage device may be sensed during the readout process.

When the X and Y matrix drive sources are in the active state, then emitter 86 passes the output signal derived from the binary storage device to transistor 88, which has an emitter 90 coupled to the base of transistor 94 of reference potential. A transistor 94, with its base coupled to the emitter 90, channels the signal to a sense output or readout circuit. Concomitantly, the binary output is conducted through a clamping emitter 96 directly to the readout circuit. Resistor 98 is coupled between the junction of emitter 96 and the readout circuit, and the power supply 72. Both sensing circuits of FIGS. 2A and 2B are characterized by improved noise immunity and low drive requirements from the binary stage.

Figure 3:
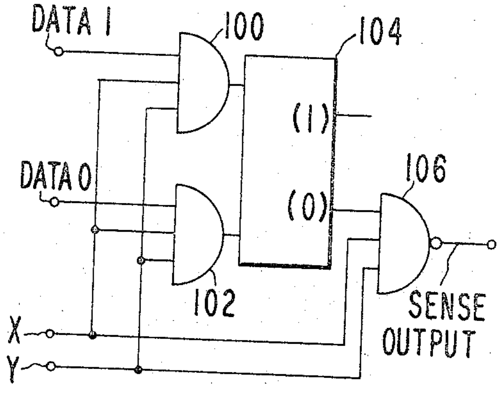
FIGURE 3 is a logic diagram of the essential elements of the invention.

In FIG. 3, a logic diagram illustrates the operation of the signal storage and readout system including the memory device of FIG. 1 in conjunction with a readout circuit of FIGS. 2A or 2B. To pass either a signal from Data 0 or Data 1 inputs, both X and Y matrix drive signals must be in the active states, corresponding to $XY$=logic 1. Thus, coincident high triggering voltages applied from the X and Y inputs open the AND gates 100 and 102 to allow either the binary 0 or 1 signal to pass to a latching circuit 104, which is the circuit shown in FIG. 1. If either the X or Y matrix drive source is in the inactive state, then the AND gates 100 and 102 are inhibited, precluding the passage of a signal to the latch 104. The latching circuit 104 stores and holds the binary information bit, which may be retrieved during the readout process.

For readout, the X and Y matrix drives are applied to an AND gate 106 that allows the signal stored in the latch circuit 104 to pass to a sense output.

It should be noted that when the X and Y matrix drive signals are applied to the AND gate 106, Data 1 and Data 0 in the inactive state or logic zeros act to negate the effect of application of matrix drive signals X and Y to the storage input. With both X and Y matrix drives in the active state, hence AND gate 106 enabled, the sense output receives the stored signal for further utilization.

Figure 4:
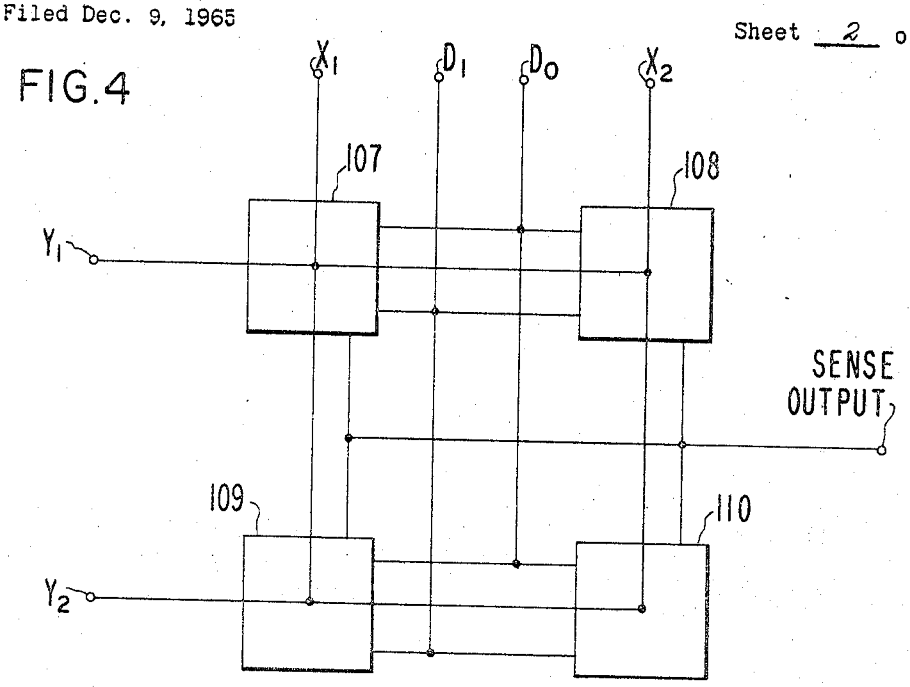
FIGURE 4 is a schematic diagram representing four memory cells of this invention, connected in a matrix to store separate data bits.

FIG. 4 depicts an arrangement of four interconnected memory devices 107, 108, 109, and 110 in a matrix format, each capable of storing separate bits of information. Each storage device is subject to be activated by its own intersection of X and Y matrix drive lines, when in the active state. Thus, device 107 responds to the $X_1$ and $Y_1$ drives, device 108 responds to the $X_2$ and $Y_1$ drives and so on. Each of the storage elements is also tied to data input sources $D_1$ and $D_0$ to store a binary bit when activated by the X and Y active state signals. The elements may be triggered sequentially by known address systems, or concurrently in parallel, such as in rows or columns.

Figure 5:
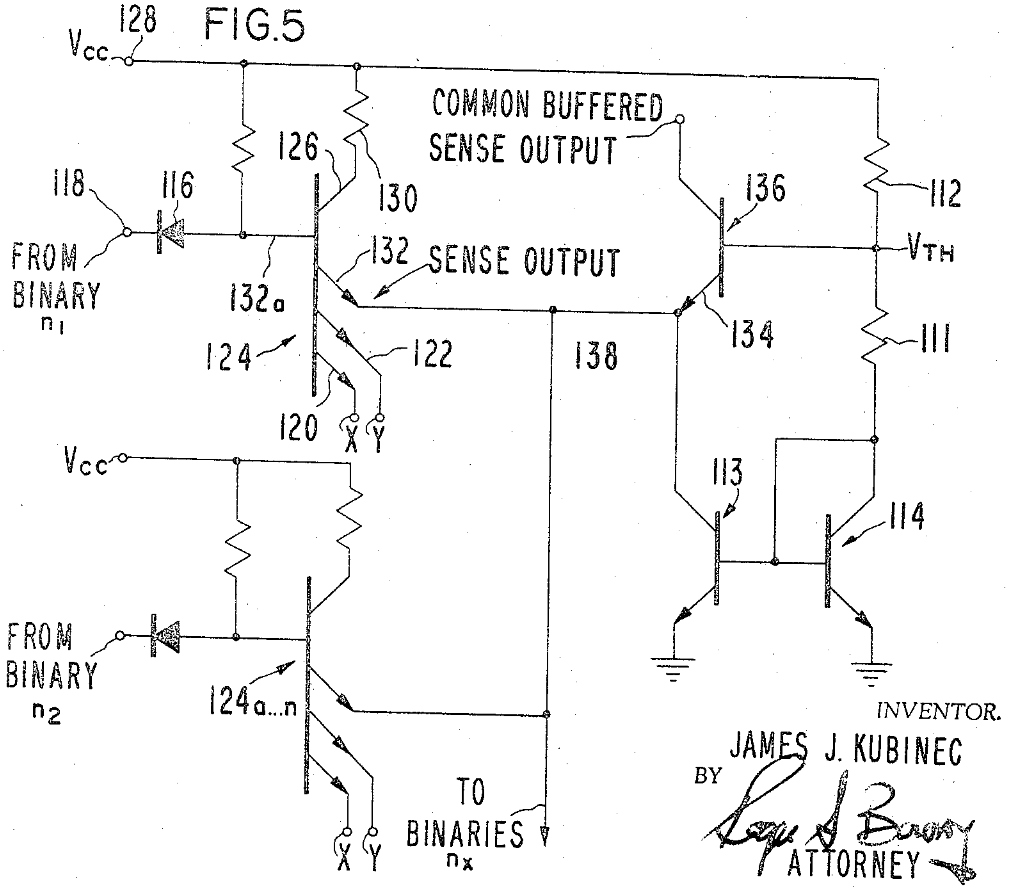
FIGURE 5 is a schematic circuit diagram of an alternative readout circuit, utilizing a plurality of multi-emitter transistors providing an output to a common buffered sense output.

FIG. 5 is directed to another sense output circuit affording high speed operation, wherein a sensing threshold voltage is employed. The threshold voltage may be established at any predetermined value by resistances 111 and 112 coupled in series to the collector voltage supply and to the common base circuit of a pair of NPN transistors 113 and 114. These transistors 113 and 114 act as a current source to maintain the current to the output circuit substantially constant.

The sensing circuit includes a diode 116 coupled to an input terminal 118, which receives the stored signal from the binary storage device whenever the X and Y matrix drive sources are simultaneously in the active state. The X and Y matrix drive sources bias the first two emitters 120 and 122, respectively, of MET 124 so that MET 124 becomes conducting. With the collector 126 of the MET 124 tied to a suitable voltage source 128 through a load resistance 130, the sensed signal is passed through a third emitter 132 of MET 124 and fed to the emitter 134 of an output transistor 136. The emitter electrode 134 of transistor 136 is coupled both to a third emitter 132 of MET 124 and to the current source comprising transistors 113 and 114 (via the collector of transistor 113). The third emitter electrode 132, the base electrode **132*a*, and the collector electrode 126 of MET 124, together with transistor 136 comprise a differential current switch. The output signal may be channeled to a sense output or to a utilization circuit, which may be a readout display for example. Terminal 138 may be used to connect any number of multi-emitter transistor circuits 124*a* . . . *n* to respective binary storage devices $n_1$–$n_x$ for readout through a common differential current switch comprising transistor 136 and the current source (transistors 113 and 114**).

The solid state memory element and readout apparatus of this invention affords nondestructive readout, high speed and high level output signals. Increased packing density at low cost is made possible and associated circuitry is relatively simple and inexpensive. While the specific embodiment chooses for the above detailed description of the invention and drawings described a three emitter MET as used in a two dimensional matrix, one skilled in the art will appreciate that matrices having more than two dimensions may be employed. In such matrices MET's having more than three emitters are used. Furthermore, other modifications and improvements may be made in the invention as described without departing from its true spirit and scope. Accordingly, the invention is to be limited only as so far as set forth in the claims which follow.

What is claimed is:

1. A signal storage and processing apparatus comprising:

first and second MET's each having at least first, second and third emitter and base and collector electrodes;

a first source of matrix drive signal having two stable states, one active and one inactive state( coupled to the first emitters of both said MET's;

a second source of matrix drive signal having two stable states, one active and one inactive state, coupled to second emitters of both said MET's;

a pair of data input signal sources coupled respectively to each of the third emitters of both said MET's;

means coupling the base of each MET to the collector of the other MET; and a sense output circuit whose inputs are coupled to both said first and second matrix drive signals and to the collector of one said MET's, whereby said sense output circuit is enabled to receive data from one of said first and second MET's when both said first and second matrix drive signals are in the active state.

2. The signal storage and processing apparatus of claim 1 further characterized by said sense output circuit having a third MET having a first, second and third emitter and base and collector electrodes, said MET being coupled to one of said first and second MET's, and two of said emitters of said third MET being respectively coupled to said first and second sources of matrix drive signals.

3. The signal storage and processing apparatus of claim 2 further characterized by said third MET being coupled through its base electrode to one of said first and second MET's.

4. The signal storage and processing apparatus of claim 3 further characterized by said sense output circuit including an additional transistor having emitter base and collector electrodes, said emitter electrode of said transistor being coupled to a third emitter electrode of said third MET, and a current source coupled to said emitter of said transistor and to said third emitter of said third MET whereby said third emitter electrode, said base electrode, and said collector electrode of said third MET, together with said transistor comprise a differential current switch.

5. The signal storage and processing apparatus of claim 4 further characterized by an output terminal means coupled between said third emitter of said third MET and said emitter of said transistor, said output terminal means being adapted to connect said transistor and said current source to additional MET's receiving other input signals, whereby the same transistor and current source serve as part of a differential current switch for a plurality of emitter electrodes from different MET's.

References Cited

UNITED STATES PATENTS 3,177,374 4/1965 Simonian ------------ 340—173

JERRELL W. FEARS, *Primary Examiner.*

U.S. Cl. X.R.

307—238